United States Patent

Sutherland

[15] 3,639,683

[45] Feb. 1, 1972

[54] COLOR KILLER CIRCUIT

[72] Inventor: John B. Sutherland, Villa Park, Ill.

[73] Assignee: Zenith Radio Corporation, Chicago, Ill.

[22] Filed: May 20, 1970

[21] Appl. No.: 39,812

[52] U.S. Cl. ..................................178/5.4 CK, 178/5.4 AC

[51] Int. Cl. ..........................................................H04n 9/48

[58] Field of Search......................178/5.4 CK, 5.4 R, 5.4 AC

[56] References Cited

UNITED STATES PATENTS

| | | | |
|---|---|---|---|
| 3,346,691 | 10/1967 | Tschannen | 178/5.4 |
| 3,502,797 | 3/1970 | Eckenbrecht | 178/5.4 |
| 2,975,231 | 3/1961 | Rhodes | 178/5.4 |

*Primary Examiner*—Richard Murray
*Assistant Examiner*—P. M. Pecori
*Attorney*—Donald B. Southard and John J. Pederson

[57] ABSTRACT

Improved color killer circuitry for disabling the chrominance processing channel during monochrome or very weak color signal reception. The circuit includes a high-speed semiconductor switching device interposed in the signal path of the chrominance channel and poled to conduct color information therethrough when the signal level is at a predetermined magnitude. At signal levels below threshold, the semiconductor switch is effectively reverse-biased. The disclosed circuitry further includes actuating means responsive to a source of potential wherein variations in signal level are indicative of instantaneous amplitude of the reference burst signal and which further represent received signal strength. When the chrominance information extracted from the received composite signal reaches a predetermined level, i.e., threshold, the semiconductor switching device becomes forward-biased thereby opening the signal path to pass appropriate chrominance information to subsequent stages in the chrominance channel.

4 Claims, 1 Drawing Figure

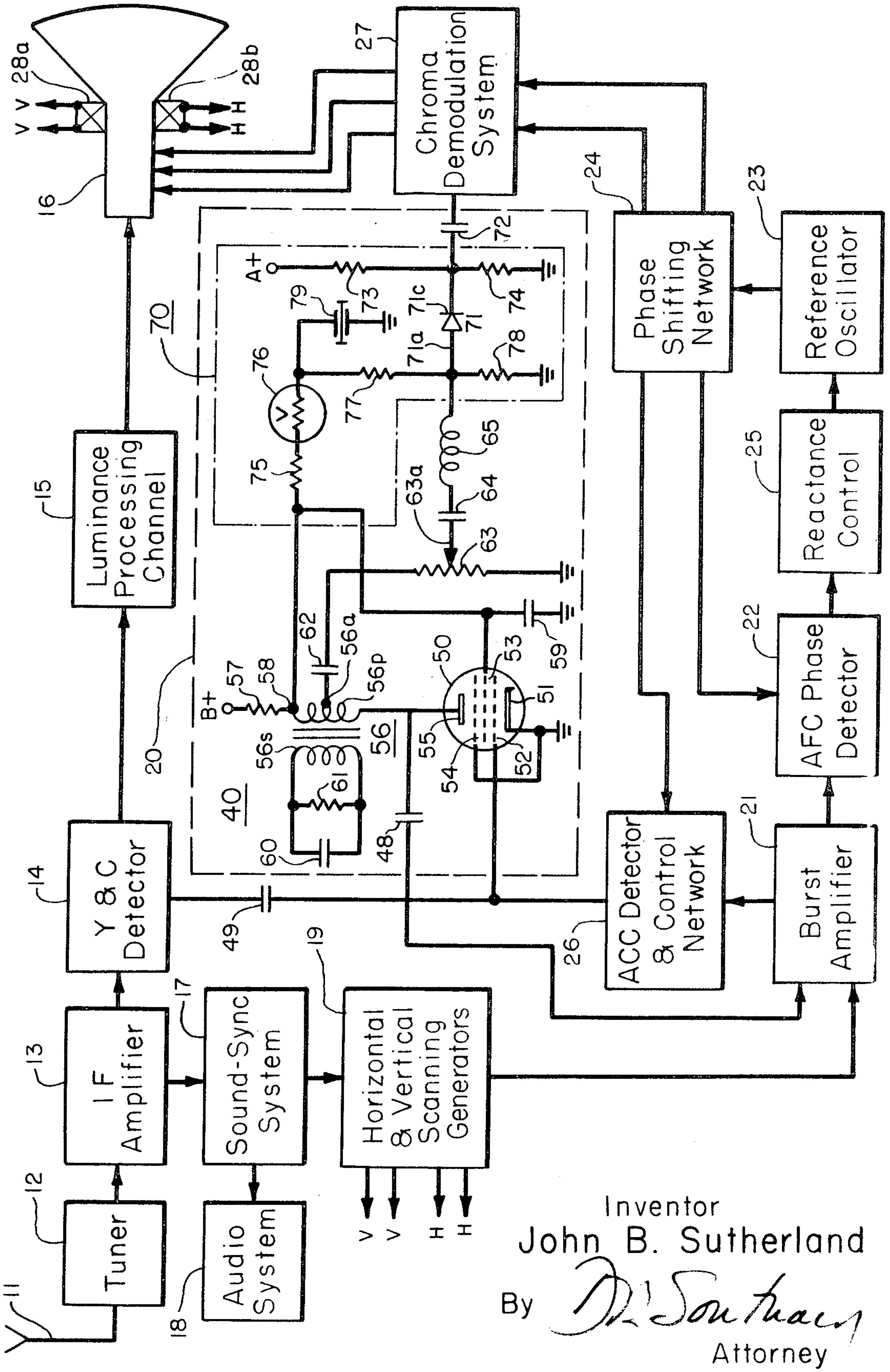
Inventor
John B. Sutherland
By [signature]
Attorney

COLOR KILLER CIRCUIT

BACKGROUND OF THE INVENTION

The present invention relates in general to color television receivers and more particularly to improved color killer circuitry for inclusion therein which is effective to block or interrupt color-modulated subcarrier information at some specific point within the chrominance channel, such as at the input to the chroma demodulation system, when the chrominance signal strength in the received signal falls below a predetermined level.

In accordance with presently established NTSC standards, a color television receiver must be able to reproduce both color and monochrome signal transmissions. Accordingly, color television receivers generally provide, in addition to the luminance processing channel, a chrominance processing channel for reproducing the color portion of the reproduced image. Since spurious "color noise" would result if the chrominance processing channel remained fully functional during monochrome reception, it has been found desirable to disable the chrominance processing channel when reference signal information falls below the level required for proper color reproduction. To insure such "color killer" circuitry will reliably disable the chrominance processing channel at all points below the desired signal level, it is mandatory that the included circuitry provide a sharp transitional switching action between respective levels above and below the referenced threshold.

As may be expected, cost is always an important consideration in the design and manufacture of mass-produced color television receivers. Accordingly, it is desirable when incorporating any proposed circuitry, such as the color killer circuitry in accordance with the present invention, that it be accomplished with a minimum of additional components. In the past, color killer circuits have generally required the provision of a separate voltage amplifier stage, distinct from the chrominance channel, for generating the necessary control potential. Additionally, a "color killer" threshold potentiometer is usually included in order to provide a service adjustment for maintaining proper color killer action as circuit components age. These additional components are costly and have added unnecessary cost and complexity to the completed color television receiver.

SUMMARY OF THE INVENTION

Accordingly, it is an object of the invention to provide new and improved circuitry for automatically disabling a selected portion of the chrominance processing channel in a color television receiver which overcomes the aforenoted disadvantages and deficiencies of prior circuits.

A more particular object of the invention is to provide an improved color killer circuit which requires a minimum of additional components for so disabling the chrominance processing channel when acceptable color reproduction is not possible.

Another object of the invention is to provide an improved color killer circuit of he foregoing type wherein a service adjustment of the "color killer" threshold due to component tolerance variations is unnecessary.

It is another object of the invention to provide an improved color killer circuit of the foregoing type wherein switching time between the enabled state and disabled state is very small.

In accordance with the present invention, an improved color killer circuit is provided for disabling a selected portion of the chrominance processing channel in a color television receiver whenever the reference signal information falls below a predetermined level or threshold. In a preferred embodiment, the color killer circuit includes a high-speed semiconductor device, preferably a diode, interposed in the signal path between the chrominance amplifier providing a source of amplified color-modulated subcarrier information and the input to the receiver's chroma demodulation system. The semiconductor switching device upon being forward-biased offers a low impedance to any color-modulated subcarrier information developed by the chroma amplifier. The semiconductor device applies the amplified color-modulated subcarrier information to the input of the chroma demodulation system when the signal strength exceeds a predetermined design level; but the semiconductor, in turn, is nonconductive at all signal levels below the established threshold. This threshold level is determined by a biasing circuit comprising a voltage divider network connected between a source and plane of reference potential and coupled to a control electrode of the switching device. The semiconductor, in turn, is conductive when the potential at a further control electrode reaches a precise, predetermined level above the threshold level. The latter is derived from the variable, unidirectional potential at the output of the chrominance amplifier in response to variations in the amplitude of the reference burst signals. As the reference signal information increases to threshold level of the semiconductor switching device, forward-biasing is established and conduction occurs. A voltage-dependent resistance is further included in the biasing circuit to provide proper tracking of the bias at the semiconductor switch with respect to variations in reference signal strength. This insures that the semiconductor switch will be enabled at precisely the selected threshold while preventing any clipping of large amplitude color-modulated subcarrier information due to insufficient forward bias across the semiconductor.

BRIEF DESCRIPTION OF THE DRAWING

The features of this invention which are believed to be novel are set forth with particularity in the appended claims. The invention together with its further objects and advantages thereof, may be best understood, however, by reference to the following description taken in conjunction with the accompanying drawing of which the single FIGURE is a combined schematic and block diagram of a television receiver illustrating a preferred embodiment of the present invention.

PREFERRED EMBODIMENT OF THE INVENTION

Referring now to the drawing, a color television receiver 10 is shown which includes color killer circuitry in accordance with the present invention. The receiver includes an antenna 11 coupled to an input tuner stage 12 which amplifies the received composite television signal and converts the same to an intermediate frequency in the well-known manner. The amplified and converted signal is coupled to an intermediate-frequency amplifier 13 where it is further amplified and coupled to a luminance (Y) and chrominance (C) detector 14, and also to a sound-sync system 17. The detected video signal from Y-C detector 14, which represents the luminance components of a color telecast, is coupled to luminance processing channel 15. In turn, the amplified signal from luminance processing channel 15 is applied to the image reproducer 16, which may be a conventional three-gun shadow-mask color cathode-ray tube as indicated at 16. The output signal from sound-sync system 17, in turn, is processed and amplified by audio system 18 for reproducing the audio portion of the received signal. Sound-sync system 17 is also coupled to horizontal and vertical scanning generators 19 which develop the usual horizontal and vertical deflection signals for application to appropriate deflection yokes **28*a* and 28*b* positioned about the image reproducer 16 so as to effect reproduction of the televised image in the conventional manner. A chrominance processing channel 20, including chrominance amplifier 40, couples chrominance signals from Y-C detector circuitry 14 to a chroma demodulation system such as at 27. Amplified chrominance signals from chrominance amplifier 40 are applied to an included burst amplifier 21, which is gated to conduction by horizontal pulses emanating from the horizontal and vertical scanning generators 19 and thereby be rendered operative only during the intervals in which reference burst signals are received. The amplified reference burst signals from burst amplifier 21 are coupled to an AFC phase detector 22 where they are compared in phase and frequency with reference signals provided by a reference oscillator 23 through phase-shifting network 24. Any detected error develops an appropriate control voltage which upon application to reactance control circuit 25 alters the output of the reference oscillator 23 in a direction to overcome any such detected phase error. The reference signal, now phase locked to the reference burst in the manner just described, is applied to the phase-shifting network 24 where appropriate alterations in phase are effected prior to being coupled to chroma demodulation system 27. The latter results in synchronous detection of the color-modulated subcarrier signal in the well-known manner to develop respective color difference signals. The derived color difference signals are applied to image reproducer 16 for combining with the luminance information from luminance channel 15 in a manner to reproduce images having proper luminance and chrominance characteristics. The output of burst amplifier 21 is also coupled to ACC detector and control network 26, wherein it is compared with signals from reference oscillator 23 (through phase-shifting network 24) so as to form a chrominance channel control signal. This control signal upon being applied to the chrominance amplifier 40 is effective to selectively control the gain of this stage in response to any variations in the amplitude of the reference burst signals and thereby maintain a constant output signal level for chrominance amplifier 40**.

As thus far described, the receiver is entirely conventional in construction and operation such that further and more particular operational description should not be necessary. More particular consideration, however, may now be given to that portion of the receiver 10 which relates to the preferred embodiment of the present invention, and in general constitutes color killer circuitry operative in cooperation with the chrominance amplifier identified generally at 40.

The chrominance amplifier 40 comprises an amplifying device, such as an electron-discharge device 50, having a cathode electrode 51, a control electrode 52, a screen electrode 53, a suppressor electrode 54, and a plate electrode 55. Cathode electrode 51 and suppressor electrode 54 are returned directly to ground while the plate electrode 55 is coupled to burst amplifier 21 through a capacitor 48.

Operationally, chrominance signals from Y-C detector 14 are coupled to control electrode 52 of electron-discharge device 50 through a capacitor 49. Additionally, chrominance channel control signals from the ACC detector and control network 26 are likewise applied to control electrode 52. As will be understood, the electron-discharge device 50, in addition to providing AC amplification of the chrominance signals, provides effective DC amplification of the applied chrominance channel control signals. It will be recalled that as the amplitude of the reference burst signals increases, the chrominance channel control signals vary generally from −0.6 volt to −6 volts. The amplified control signals effected by amplifier 50, in turn, vary approximately from 90 to 225 volts at the plate electrode 55. A source of unidirectional potential (B+) is coupled to the plate electrode 55 through a load resistance 57 and the primary winding **56*p* of a transformer 56, forming an interconnection terminal 58**.

As shown, screen electrode 53 is coupled to junction 58 and is bypassed to ground at signal frequency by a capacitor 59. The secondary winding **56*s* of transformer 56 is tuned to frequencies within the chrominance signal bandwidth by a parallel-coupled capacitor 60 and adjustment of the tuning slug (not shown) included in the interior of winding 56*s*. This parallel resonant circuit acts to modify, or linearize, the general chrominance band-pass signal developed by primary winding 56*p* such that amplitude and phase distortions in the chrominance signal are minimized. A resistor 61 is connected in parallel with secondary winding 56*s* and capacitor 60 to provide appropriate damping. A tap 56*a* on primary winding 56*p* provides a source of amplified color-modulated subcarrier information having alternating components coupled through a capacitor 62 to one terminal of a potentiometer 63, the other terminal being connected to ground. Potentiometer 63 serves as the color saturation control. Arm 63*a* of potentiometer 63 applies a portion of the developed signal at the output of amplifier 50 to a series circuit formed by a capacitor 64 and a choke coil 65. Choke 65 provides a wideband phase shift in the color-modulated subcarrier information to insure that it is in phase with the reference signal from reference oscillator 25. The output terminal of choke 65 serves as an input to the color killer circuitry 70**.

In accordance with the present invention, color killer circuitry, identified generally at 70, is provided which, in conjunction with the circuitry of chrominance amplifier 40, is effective to interrupt continuity of the signal path to the input of the chroma demodulation system 27 when reference signal information drops below a predetermined level. The circuitry 70 comprises a high-speed switching diode 71 coupled to choke 65 as shown and is poled to conduct applied color-modulated subcarrier information to demodulation system 27 through a coupling capacitor 72. Threshold conduction level of the diode 71 is effectively determined by a voltage divider network comprising resistors 73 and 74 serially connected between a source of unidirectional potential (A+) and ground. As will be understood, by connecting diode cathode electrode **71*c* to the junction between resistors 73 and 74, a predetermined bias voltage is maintained at that point Thus, if the diode 71 is to be rendered conductive, the potential at diode anode electrode 71*a* must exceed the threshold conduction level by at least 0.6 volt (for a silicon diode) in order to overcome the voltage drop across diode 71 resulting from its low forward impedance of approximately 10 ohms. As indicated, a resistive biasing network consisting of serially connected resistors 75, 77 and 78 together with a voltage-dependent resistance 76 is coupled between junction point 58, which for DC considerations varies in the level of unidirectional potential developed at plate electrode 55, and ground potential. Voltage-dependent resistance 76 tracks the voltage swing on plate electrode 55 to insure that large amplitude color-modulated subcarrier information is not clipped due to insufficient bias across diode 71. Capacitor 79 is connected between the junction of voltage-dependent resistance 76 and resistor 77 and ground to insure that the color-modulated subcarrier information has substantially no effect on the bias as applied to switching diode 71. Anode electrode 71*a* is further coupled to the junction between resistors 77 and 78, thereby applying a variable, unidirectional potential to diode 71** for the switching thereof between its conducting and nonconducting states.

Operationally, the variable, unidirectional potential developed at plate electrode 55 of electron-discharge device 50 will approach its maximum level as the chrominance channel control signal becomes more negative in response to reception of stronger signals. At a predetermined design level where the received signal strength is deemed adequate to permit acceptable color reproduction, the DC potential at junction 58 is resistively divided to apply a portion thereof to the anode electrode **71*a* of diode 71 sufficient to render the same conductive. As a result, amplified color-modulated subcarrier information appearing at primary winding tap 56*a* is effectively coupled to the input of color killer circuitry 70 and from there through forward-biased diode 71 to the chroma demodulation system 27**.

Conversely, during the reception of monochrome or very weak color signals, the chrominance channel control signal from the ACC detector and control network 26 is less negative resulting in reduced unidirectional potential at the chroma amplifier plate electrode 55. In turn, the potential as applied to the anode electrode **71*a* through the resistive network components 75, 76 and 77 drops below the level required for conduction by switching diode 71. Accordingly, it will be appreciated that all signal information is effectively blocked by color killer circuitry 70 and prevented from reaching chroma demodulation system 27**.

With the operative switching element in the color killer circuitry 70 interposed in the signal path between chrominance amplifier 40 and demodulation system 27, it is unnecessary to provide further control action for the latter. The simple switching action of diode 71 directly controls the input to chroma demodulation system 27. Furthermore, the relatively close tolerances of diode parameters presently exhibited in commercial units, together with close tracking of the A+ and B+ potential sources as previously described, renders unnecessary the usual costly potentiometer formerly required for acceptable control of the threshold of color killer action. In addition, proper selection of voltage-dependent resistance 76 provides correct tracking between the bias applied across diode 71 and the received signal strength.

The embodiment as disclosed herein is essentially similar to the circuitry of a commercialized version of the invention. Circuit impedance values and other parameters are set forth below. It is to be understood, however, that such are set forth purely by way of illustration and not as limitations thereon.

| | | | |
|---|---|---|---|
| source | A+ | volts | +24 |
| source | B+ | volts | +250 |
| capacitor | 48 | picofarads | 47 |
| capacitor | 49 | picofarads | 7 |
| resistor | 57 | ohms | 22K |
| capacitor | 59 | microfarads | 0.0047 |
| capacitor | 60 | picofarads | 36 |
| resistor | 61 | ohms | 4.7K |
| capacitor | 62 | picofarads | 220 |
| potentiometer | 63 | ohms | 500 |
| capacitor | 64 | picofarads | 220 |
| inductor | 65 | microhenrys | 12 |
| capacitor | 72 | picofarads | 220 |
| resistor | 73 | ohms | 10k |
| resistor | 74 | ohms | 1K |
| resistor | 75 | ohms | 82K |
| resistor | 77 | ohms | 3.3K |
| resistor | 78 | ohms | 10K |
| capacitor | 79 | microfarads | 1.0 |
| diode | 71 | | silicon diode |
| voltage-dependent resistor | 76 | | 1 MA at 82 VDC |
| electron-discharge device | 50 | | Type 6KT8 |

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. Improved color killer circuitry for a color television receiver having a source of derived color-modulated subcarrier information, a source of a variable, unidirectional potential proportional to the amplitude of the reference burst signal and indicative of the received signal strength, a chroma demodulation system, and a plane of reference potential, said color killer circuitry comprising in combination:

high-speed electronic switch means including a semiconductor device having a first control electrode coupled to the source of derived color-modulated subcarrier information and a second control electrode coupled to the chroma demodulation system, said semiconductor device being effective to pass signal information therethrough only when forward-biased to conduction;

bias means coupled to one of said control electrodes for establishing a predetermined threshold conduction level; and switch actuating means comprising a voltage divider network connected between said source of variable, unidirectional potential and said plane of reference potential and having an intermediate junction point coupled to the other of said control electrodes of said semiconductor device whereby a control potential is applied to forward bias said high-speed switch means to pass signal information therethrough to the chroma demodulation system only when the referenced chrominance information in the received signal exceeds a predetermined, selectable level, and a voltage dependent resistance for providing proper tracking of said applied control potential to said other control electrode of said semiconductor switch means with respect to variations in received signal strength.

2. Improved color killer circuitry for a color television receiver in accordance with claim 1, wherein said semiconductor device comprises diode means poled to conduct color-modulated subcarrier information to said chroma demodulator when forward biased to said conductive state.

3. Improved color killer circuitry in accordance with claim 1, wherein said bias means comprises a further voltage divider network connected between a source of fixed unidirectional potential and said plane of reference potential and having an intermediate junction point coupled to said one control electrode of said switch means.

4. Improved color killer circuitry in accordance with claim 1, wherein the means for deriving said color-modulated subcarrier information and said source of variable, unidirectional potential include amplification means having an output coupled in series with an inductor and resistor, said source of color-modulated subcarrier information being developed across said inductive load and said source of variable, unidirectional potential being developed at the junction of said resistive and said inductive loads.

* * * * *